Jan. 17, 1939.   C. C. HALL   2,144,055
EXTRUSION MACHINE FOR FORMING COMPRESSED FEEDS
Filed Aug. 18, 1937   3 Sheets—Sheet 2
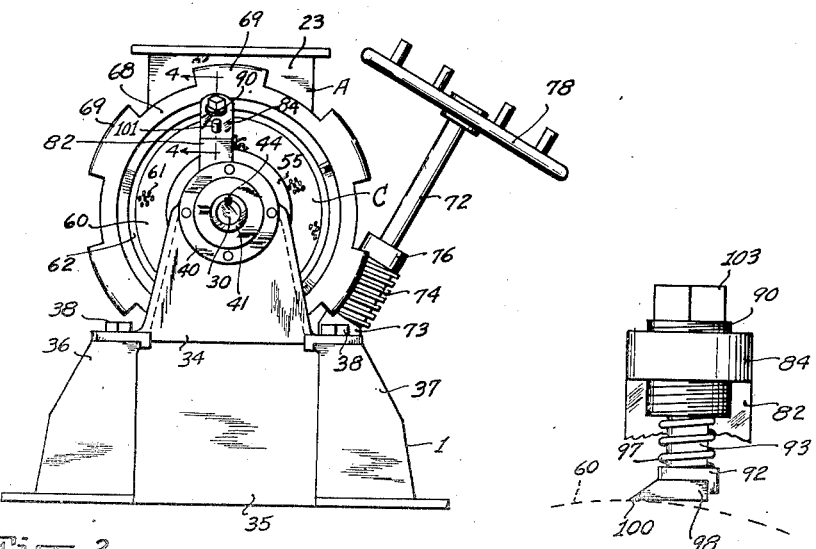
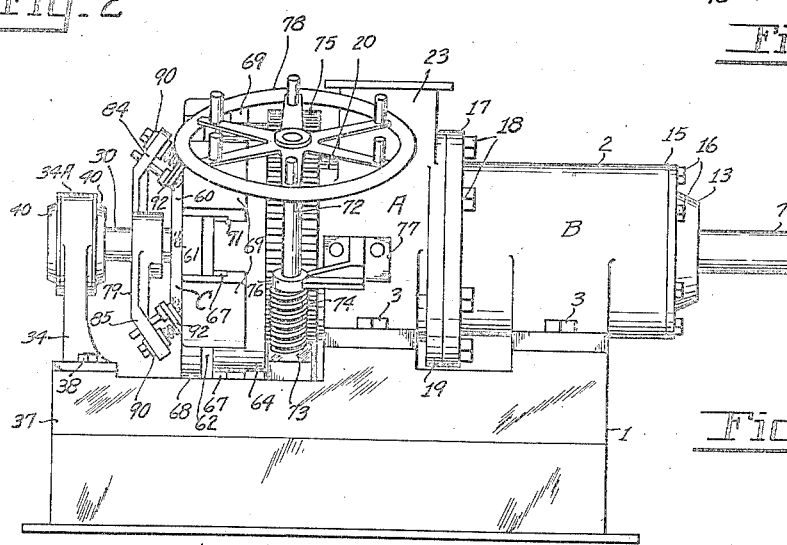
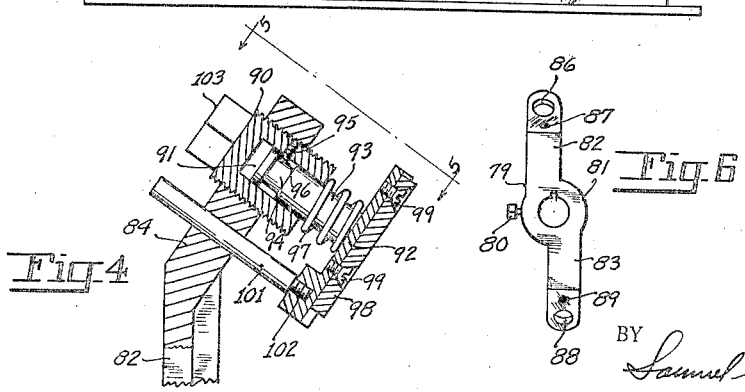
INVENTOR.
Claude C. Hall
BY Samuel S. Jacobson
ATTORNEY.

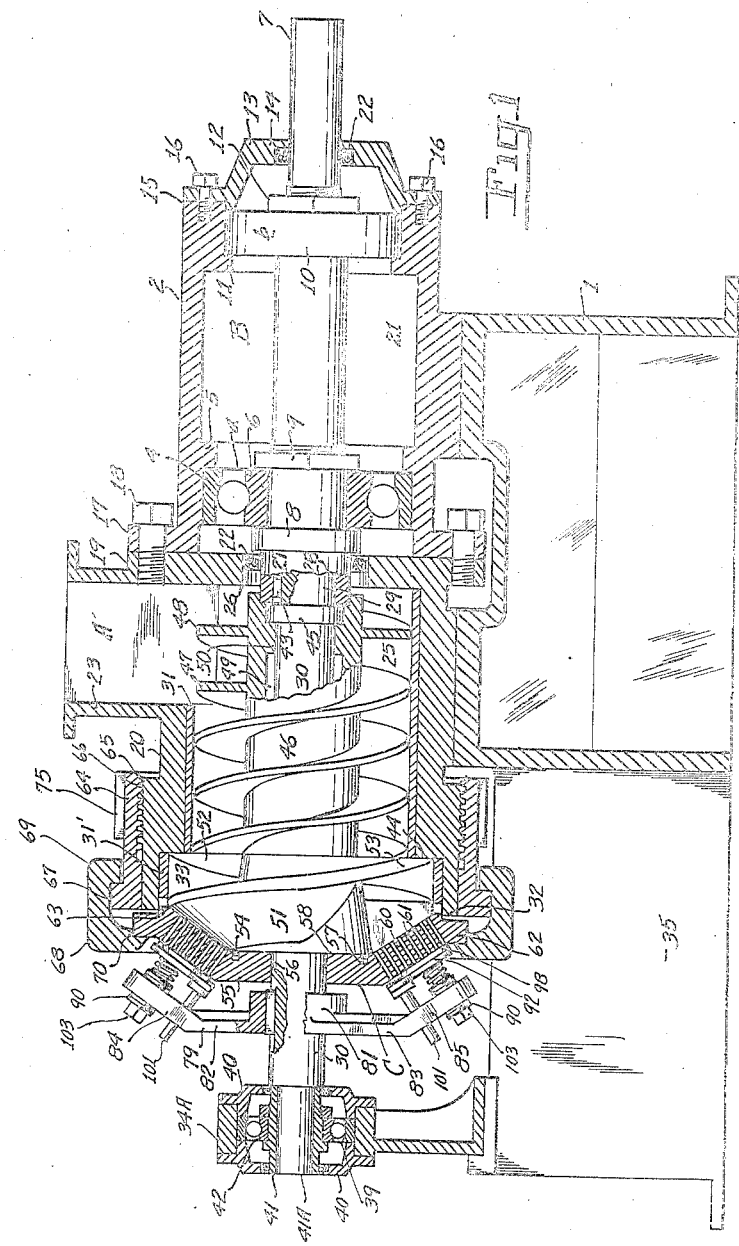

Jan. 17, 1939. C. C. HALL 2,144,055
EXTRUSION MACHINE FOR FORMING COMPRESSED FEEDS
Filed Aug. 18, 1937 3 Sheets-Sheet 3

INVENTOR.
Claude C. Hall
BY
ATTORNEY.

Patented Jan. 17, 1939

2,144,055

UNITED STATES PATENT OFFICE 2,144,055

EXTRUSION MACHINE FOR FORMING COMPRESSED FEEDS

Claude C. Hall, Portland, Oreg.

Application August 18, 1937, Serial No. 159,721

6 Claims. (Cl. 107—14)

This invention relates to machines for compressing, molding and comminuting into feeds sundry plastic, semi-plastic, or non-plastic mixtures. The invention particularly relates to improvements in extrusion machines wherein the continuous compression, formation and comminution of the materials is effected by means of a worm-screw conveyor, a compression-head, both rotating within a cylindrical casing, a foraminated die, knives for continuously severing the material extruded through the die, and means for providing adjustment between the die and the compression-head.

Briefly stated, the machine consists of a cylindrical casing in which a screw-worm conveyor and compression-head rotate. A novel type of die is disposed at the front end of the casing and in front of the compression-head. Means are provided for mechanically regulating the distance between the die and the compression-head. Knives of novel construction are also employed. Means are also provided for reducing the thrust pressure normally created in machines of a kindred nature. There is likewise provided means for preventing radial perturbations of the main shaft to which the screw-worm conveyor, compression-head, and knives are keyed.

Generally stated, the machine operates as follows: The conglomerate mass to be processed is continuously delivered to the screw-worm conveyor which, in turn, conveys the mass toward the compression-head at an even rate of speed and in substantially even quantity. The mass is finally delivered to the area immediately in front of the inner face of the die and is then forced by the compression-head through the small perforations or openings in the die under substantially even pressure. Feed compressed into uniform size and density is extruded through the openings and is severed into small units of feed by cutting members which rotate in direct relation to the rotation of the feed-worm conveyor and the compression-head.

It is and has been the general practice in the manufacture of compressed feeds of all types to first apply steam to the materials to be compressed before this mixture is permitted to enter into the compressing machine. It has been determined that this steaming of the conglomerate mass is deleterious to the resulting product, destroying some of the vital elements and effecting the solidity of the compressed feed. But this process has nevertheless been and still is employed, because the compressing machines heretofore developed and now generally in use were and are incapable of effectively and efficiently compressing the materials to be processed in a relatively cold state. Apparently steam is required in order to avoid the tendency of the materials attempted to be compressed from clogging the machine. In other words, it has been found that the steaming of the materials to be processed prior to their entry into the compressing machine merely aids in the compressing operation by preventing the clogging of the machine and hence by preventing the premature wear of the operating parts thereof. It is obvious that, to employ the steaming process, it was and is necessary to use additional apparatus which is not directly a part of the compressing unit but is merely an adjunct to the same. No such additional apparatus is necessary or desirable in connection with my present invention since it operates on the materials being processed without first steaming said materials.

Tests have been made with a machine embodying my invention in compressing a conglomerate mass without first steaming it, and the results of such tests definitely prove that the resulting product retains all the essential ingredients and is not only superior in other respects but does not clog up the machine; and, of even greater importance, a machine embodying my invention can be placed in operation after it has remained inactive for some time and the compressed mass has been allowed to remain in the die. This is very difficult to accomplish with the present type of machines.

The principal desiderata of my invention is to provide a machine for producing pellets, cubes, or other types of feeds without the application of steam or other heating means to the mixture being processed prior to its insertion into the machine.

A salient object of my invention is to incorporate in a machine embodying the principles of my invention a die possessing such novel form as to include therein a larger working surface without appreciably increasing the diameter of said die and possessing greater strength than the present type of flat die or ring die.

An equally important object of the invention is to provide a foraminated die, the construction of which reduces the differential between the inside and outside diameters of its perforated portion and results in the production of feeds of uniform size and length.

Still another important object of the invention is to materially reduce the rearward thrust normally taken by the thrust bearing and to transfer some of said pressure onto the main shaft.

Another object of my invention is to provide a compression-head, the threads of which are adapted for uniformly distributing the materials to be compressed upon the inner face of said die and to force said material through the passages in the die while at the same time taking some of the pressure and directing it toward the main shaft.

As a corollary to the previous object, the contours of the threads of the compression-head permit the utilization of the natural centrifugal tendency created by the rotation of the compression-head for directing the materials in process towards the inner working surface of the die and thus materially aid in effective and efficient extrusion of the materials through the die.

Another object of my invention is to employ the natural centrifugal forces created by the rotation of the compression-head for the purpose of relieving end thrust on the die and the means employed for retaining the die in position.

Still another object of my invention is to provide for use in a machine of the type referred to knife assemblies which are positioned with respect to the outer face of the foraminated portion of the die so that the cutting edge of the knives meets the face of the die at its axis at all times.

Still another object of the invention is to provide a machine which substantially reduces thrust pressure and which has means for dispersing any of the rearward thrust and radial pressure at different portions of the machine, thereby eliminating the possibility of premature wear at any one portion of the machine.

The present invention has for one of its objects the provision of means for retaining the main shaft in proper alignment at all times.

Another object of the invention is to provide means for permitting any necessary adjustment between the die and the compression-head while the machine is in operation.

A still further object of my invention is to provide a machine especially advantageous for the continuous production of feeds of different consistency and texture and of various sizes and shapes and which is capable of operating at speeds materially greater than are now attainable with the present type of kindred machines and which, though operated at the same speed, is adapted for producing a greater quantity of feed in an equal period of time with a material reduction in consumed power.

A further object of my invention is to provide a machine which is comparatively free from operating annoyances and which is simple in construction, having few working parts subject to wear, and thereby lessening the possibility of losses due to shut-downs for repairs and replacements.

As the following detailed description of my invention unfolds itself, other objects and advantages inherent in my invention will become apparent, especially when studied in conjunction with the accompanying drawings which form a part of this specification and which illustrate, by way of example only, the preferred manner by which the invention may be practically applied and in which:

Figure 1 is a sectional, side elevation of a machine embodying the principles of my invention.

Figure 2 is an end elevation of the machine shown in Figure 1.

Figure 3 is a side elevation of the machine shown in Figures 1 and 2.

Figure 4 is a sectional, side view, taken on line 4—4 of Figure 2, looking in the direction indicated, showing the structural details of one of the knife assemblies.

Figure 5 is an end view, taken on line 5—5 of Figure 4, looking in the direction indicated, illustrating the normal relationship between the knife and the outside working face of the die.

Figure 6 is a front elevation of the supporting arm for two knives.

Corresponding and like parts are referred to in the following description and designated in the several views in the drawings by identical reference characters.

Figures 7, 8:
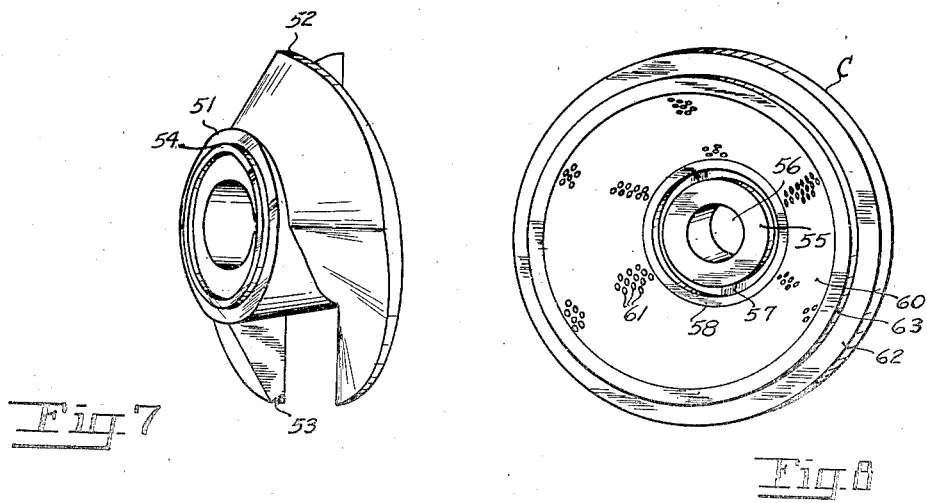
Figure 7 is a perspective, front elevation of the compression-head embodying the principles of my invention.
Figure 8 is a perspective elevation of a die embodying the principles of my invention, looking toward the inside of the die.

The preferred embodiment of the invention, illustrated in the drawings, possesses a base 1 which is constructed to not only support the machine but also to prevent excessive vibrations when the machine is in operation. The screw-worm conveyor and compression-head assembly, generally designated by reference character A, and the driving assembly therefor, generally designated by reference character B, are secured to the base 1 in any desirable manner, as by bolts 3 as shown in Figure 3. While the machine is shown positioned horizontally, it is capable of operation while in a vertical position with equal effectiveness; hence the position shown should not be considered limitational.

The driving assembly B consists of a casing 2 removably and fixedly secured to base 1 by the means illustrated. Bearings $a$ and $b$ are disposed in spaced relationship to each other within casing 2 as shown in Figure 1. Bearing member $a$ has its outer raceway 4 fixedly held against the inner annular flange 5 of the casing 2, and its inner raceway 6 is fixedly secured to the power take-off shaft 7 (which may receive its rotation from any source of power through any desirable connection therewith) and held against shaft flange 8 by any suitable means, as by nut 9. Some of the rearward thrust on the screw-worm conveyor and compression-head, caused by the extrusion of the materials through the die during the process of compression and molding, is taken by bearing $a$. Bearing $b$ has its outer raceway 10 fixedly held against the inner annular flange 11 of casing 2, and its inner raceway (not shown) is fixedly secured to power take-off shaft 7 and held against another shaft flange (not shown) by any suitable means, as by nut 12. An end plate 13, having a hub 14 therein directly aligned with the hubs in bearings $a$ and $b$, is removably secured to the end 15 of casing 2 by any suitable means, as by threaded bolts 16. An upwardly extending annular flange 17 is formed at the peripheral edge of casing 2. This flange possesses a number of openings suitable for having threaded bolts 18 disposed therein in order to securely connect the casing 2 to the flanged rear end 19 of cylindrical casing 20 of which more will be stated shortly. It should now be apparent that casing 2 is adequately protected against any normal strain created by the operation of the machine, since it is secured to both the base 1 and the cylindrical casing 20, although casing 2 may be readily removed from its station, whenever it is desired to inspect, repair, or replace the bearings a and b. Lubricating oil is normally disposed within chamber 21 formed within casing 2 and any suitable means for preventing its escapement, such as packings 22, are disposed about power take-off shaft 7.

The screw-worm conveyor and compression-head assembly A also has its cylindrical casing 20 removably and fixedly secured to base 1 by bolts 3. A flanged, hollow neck 23 is integrally formed at the rear of casing 20, extends upwardly therefrom, and communicates with the interior 25 thereof. Any conventional feeding mechanism may be secured to the flange of the neck 23 or any method may be employed in feeding the mixture to be processed through neck 23 into the interior 25 of casing 20. Since the feeding of materials into the interior 25 is not a part of this invention, no structure is shown. The flanged rear end 19 of casing 20 has an opening 26 disposed therethrough. The end 27 of the power take-off shaft 7 extends through the opening 26 and enters for a short distance into the interior 25 of casing 20. A cylindrical recess 28 is formed within the end 27 of the shaft 7. This recess forms a bearing for the end 29 of main shaft 30 about which there is more to be stated. A sleeve 31 is tightly fitted into the interior 25 of casing 20. This permits the relining of the interior of the casing whenever such is deemed necessary or desirable.

The interior 25 is materially enlarged immediately adjacent the front end 32 of casing 20 as indicated by reference numeral 33, and sleeve 31' is also tightly fitted into the interior 25 and is of course replaceable. This increase in the circumference of the interior provides an annular shoulder 44 between the two interiors which acts to prevent the conveyed materials from crowding back from enlarged interior 33 toward interior 25.

A bearing supporting block 34 bridges extruded feed well 35 formed within base 1 and is removably and fixedly secured to supports 36 and 37 extending upwardly from base 1 by any desirable means, as by bolts 38. A bearing 39 fits into the collar 34A of block 34 and is securely supported therein by plates 40. A sleeve 41 surrounds the front portion of shaft 30 and is keyed thereto. The inner raceway 42 is securely held on said sleeve. It was heretofore briefly mentioned that main shaft 30 had its end 29 seated within recess 28. It will be seen that from the arrangement described, end 41A is supported on bearing 39. The shaft is therefore supported at both its ends, but while it is free to rotate through its connection with the inner raceway 42 of bearing 39, it is directly keyed to power take-off shaft 7 by key 43. There are innumerable advantages to providing such supports for the main shaft. The parts keyed to the shaft, such as the compression-head, the screw-worm conveyor and the knife assemblies all rotate without any appreciable perturbation. Furthermore, the radial pressure caused by the extrusion of the materials through the die C is taken up by the bearing 39 and its support 34.

The shaft 30 possesses a flange 45 which is positioned adjacent the end 29. This flange serves to limit the insertion of the end 29 into the recess 28 and also serves as a stop for the screw-worm conveyor. It also serves to take up the rearward thrust and transfer it to shaft 7.

It is desired that the screw-worm conveyor 46 employed in the drawings be considered as representative of any type of screw-worm conveyor which may be employed for the purpose of conveying the mixture to be processed from the rear of the interior 25 toward and into the enlarged interior 33. It has been found that this invention is especially adapted for using a screw-worm conveyor embodying the invention covered by my United States Patent No. 1,946,740. Furthermore, while the screw-worm conveyor is shown in the drawings as employing two helical threads 47 and 48 of equal pitch, it is to be understood that the number of threads or the degree of pitch employed in a screw-worm conveyor in connection with my invention will not affect the principles of the invention. Screw-worm conveyor 46 has a longitudinal bore 49 extending therethrough and a pair of annular flanges 50 (only one of which is shown) extending inwardly in said bore. When the screw-worm conveyor is positioned upon shaft 30 and conventionally keyed thereto, so that it may rotate within casing 20, when the shaft 30 rotates, the flange 50 (exposed in Figure 1) is seated against the flange 45 which is an integral part of the shaft 30. By this construction the rearward thrust upon the screw-worm conveyor 46 is taken by the flange 45 which in turn transfers said thrust to the end 27 of power take-off shaft 7. It will be seen that screw-worm conveyor 46 occupies the entire interior 25 of casing 20 and that no part of it occupies the enlarged interior 33. The function of screw-worm conveyor 46 is largely that of conveying the materials to be processed toward and into the interior 33 so that the compression-head 51 may operate upon the material and force it through the die.

The compression-head 51 may be considered representative of the compression-heads covered by my United States Patent No. 1,946,740, although it is materially modified for use in connection with the die employed in this invention. Compression-head 51 has two helical threads 52 and 53 of equal pitch disposed in opposition to each other. It is well to point out that the number of threads on the compression-head is determined by the number of threads on the screw-worm conveyor. The start of these threads contact the ends of the threads of the screw-worm conveyor. This relationship is assured by keying the compression head 51 to shaft 30 when the compression-head is inserted into the enlarged interior 33. The compression-head 51 not only occupies the entire interior 33 but it also extends materially beyond the interior 33 as graphically illustrated in Figure 1. Extending outwardly from the hub of the compression-head 51 is an annular ring 54 the function of which will be apparent after the die is fully described. The importance of the pitch of the threads 52 and 53 (or any additional threads) to the effective operation of this machine cannot be overestimated. The effectiveness of the die C is largely determined by the relationship of the threads on the compression-head to the inner working face of the die. There is a direct correlation between the contours of the threads of the compression head and the contours of the inner working face of portion 60 of die C. In fact, the operating effectiveness is directly determined by this relationship. Hence it is important to note that the threads of compression-head start on a vertical plane and gradually develop into the angle corresponding to the angle possessed by the inner working surface of die portion 60, and this angle is maintained throughout that portion of the threads which press the materials being processed through the die openings: The length of the angled portion of the threads is varied in compression-heads having more than two threads.

The die, generally designated by reference character C, possesses features not heretofore found in kindred art. It is well to call attention to the fact that the construction of the present invention permits the use of a relatively thick die-plate whose diameter is somewhat greater than the type of die-plate now in use. By this expedient the output of the machine is greatly increased without increasing the size of the machine.

The structural characteristics of die C may be clearly viewed by referring to Figures 1 and 8. The die C is largely bowl-shaped but the working surface is frustoconical in contour. The construction of a die possessing such contours materially strengthens it. The die possesses a solid face 55 through which an opening or hub 56 extends. An annular groove 57 is formed within the inner face 58 of the die C and surrounds opening 56 as shown in Figure 1. When the die is placed in working relation to the compression-head 51, the annular ring 54 fits snugly within groove 57 and this arrangement insures against any of the materials leaving the machine through hub 56. Angularly extending from solid face 55 and as an integral part of the die, is the frustoconically-shaped die portion 60, the passages 61 of which extend at right angles to die portion 60. The perforations may be made to assume any shape or contour. It is deemed desirable to point out at this time that the portion 60 may be inclined at any angle other than the angle shown in the drawings; but, regardless of the angle given to portion 60, the angle of its inner working face must correspond to the angles given to the threads of the compression-head since, as stated heretofore, it is of utmost importance that the contours of the working surface of the die and the threads of compression-head 51 be correlated in order to successfully operate a machine embodying the invention. Included in the die C there is an annular peripheral flange 62 which extends from the die portion 60 in parallel spaced relation to the solid face 55. An annular shoulder 63 extends inwardly from and at right angles to flange 62 in which, when occasion demands, die C may be seated adjacent the end 32 of casing 20. To permit such relationship it is obvious that the outer circumference of the flange 63 is equal substantially to the inner circumference of the enlarged interior 33 of casing 20, and it is further obvious that the sleeve 31' does not completely surround the enlarged interior 33. More will be said forthwith concerning the die and its characteristics both structural and operative.

It was heretofore pointed out that a substantial portion of the compression-head 51 extends beyond the enlarged interior 33. When the die C is fitted over, but not connected to, shaft 30, that portion of the compression-head 51 which extends beyond the enlarged interior 33 is confined within the bowl-shaped area formed by the novel contours of the die C as graphically shown in Figure 1. A die possessing the characteristics herein described materially reduces the thrust on bearing a and transfers a part of the pressure to the shaft 30. Further, such construction reduces the diameter differential between that portion of the die nearest its hub and that portion adjacent the periphery, resulting in the production of feeds of uniform size.

Since the die is freely mounted on the shaft, it is essential that it be prevented from rotating, when the screw-worm conveyor 46, the compression-head 51, and the shaft 30 are rotated. Furthermore, the proper degree of relationship between the threads 52 and 53 of compression-head 51 and the interior portion of die C cannot be obtained without some provision for adjustment. These two functions are fulfilled by a number of elements which are correlated to provide stationary security for the die and proper adjustment between the die and the compression-head. These include: A jacket 64, which is rotatably disposed about casing 20, said jacket having an internal thread 65 therein which is capable of threaded engagement with corresponding threads 66 formed on top of casing 20. Jacket 64 also has a plurality of locking ledges 67 extending therefrom adjacent one of its front ends. A retaining ring 68 has as many U-shaped locking lugs 69 extending from its periphery as there are ledges on the jacket 64. An annular recess 70 is formed within the retaining ring and a portion of the outside of the flange 62 of die C is seated therein. When the retaining ring 68 is placed upon the jacket 64 so that the ledges 67 fit into lugs 69, the die is fixedly retained with respect to the jacket 64. This arrangement provides a rigid support for the die while, at the same time, it lends itself to easy manipulation when it is desired to disassemble the machine. Stops 71 are provided on the jacket 64 to prevent the ring 68 from rotating about the jacket 64 when the machine is in operation.

The adjustment between the die C and the compression-head 51 is accomplished by the provision of a shaft 72 journaled within the base 1 as shown at 73, to which a pinion 74 is secured. This pinion 74 is at all times in mesh with the external gear teeth 75 formed on the exterior of jacket 64. An additional shaft support 76 is provided which is supported by bracket 77 secured to casing 20. A hand-wheel 78 is secured to the upper end of shaft 72 in any well-known manner. It at once becomes obvious that by the turning of the hand-wheel 78, pinion 74, meshing with gear teeth 75, causes the jacket 64 to be rotated about the casing 20 on the threads through gears 64 and 65 to thereby move the jacket and die toward or away from the end 32 of the casing 20 which in turn increases or decreases the distance between the inner face of the die and the compression head.

A knife blade supporting member 79 is keyed to shaft 30 as shown in Figure 1 and positioned thereon so that the sharp edges of the knives are set slightly in rear of the ends of the compression-head threads. A screw 80 is threadably positioned within the member 79 so that once the member is keyed to the shaft and the end of the screw contacts the outside circumference of the shaft 30 the member 79 is rendered immovable about the shaft and rotates only when the shaft is rotated. Member 79 consists of a hub 81 having two arms 82 and 83 extending therefrom in opposite directions from each other. These arms are offset from each other as shown in Figure 6. The importance of these offsets will become apparent from a description of the knife blade holder. It should be understood that the disclosure and description of a knife blade supporting member having two arms is merely for consistency and is not to be considered as a limitation. A knife blade supporting member having two arms is employed to coincide with the disclosure of a double-threaded screw-worm conveyor and two-threaded compression-head. It is obvious that a knife supporting member having triple, quadruple, or more, arms might be employed where it is essential to the operation of a machine of this type. Arms 82 and 83 are bent inwardly as shown at 84 and 85 respectively. The bent portions 84 and 85 are positioned parallelly to the outside surface of the die portion 60. The bent portion 84 of arm 82 has a threaded opening 86 and an opening 87 extending parallelly therethrough. The bent portion 85 of arm 83 has a threaded opening 88 and an opening 89 extending parallelly therethrough. In Figures 4 and 5 the details of construction of a knife blade holder and the position the knife assumes with relation to the outside surface of the working portion 60 of die C are graphically shown.

A description of one of these knife holders should suffice, since they all possess the same structural characteristics. Consequently, while only a portion of the member 79 will be referred to in the description that follows, it should be assumed that it applies to the other portion of the member 79. A member 90 is threadably engaged in threaded opening 86 of arm 84. Threaded member 90 has a cylindrical recess 91 disposed therein. A knife blade supporting member 92, having a stem 93 extending at right angles therefrom, is positioned within the cylindrical recess 91. Stem 93 has a cylindrical groove 94 formed adjacent its free end; and a threaded member 95, threadably disposed with relation to the side of member 90, has its end 96 positioned at all times within cylindrical groove 94. By this method the knife supporting member 92 is removably joined to member 90. A resilient element, as spring 97, surrounds stem 93 and is disposed between the threaded member 90 and knife supporting member 92. This spring serves the purpose of cushioning the knife 98 which is joined to the knife supporting member 92 by any desirable means, such as threaded screws 99. Knife 98 has a sharp edge 100 therein which meets the outside circumference of the working portion 60 of die C as shown in Figure 5. The offset provided in the arms of the knife supporting member 79 is necessary in order that the sharp edge 100 of the knife 98 meets the outside surface of the working portion 60 of the die C on the axis of the die. This is desirable in order to permit only the sharp edge of the knives to contact the die and to eliminate the cost of machining a knife to fit the contour of the die. Furthermore, such positioning of the knives results in clean-cut pellets. In order to maintain the knife blade 98 in proper working relation to the outside surface of the working portion of the die, a stem 101, which is slidably disposed within opening 87 of the bent portion 84, is threadably secured to the knife supporting member 98, as shown at 102. It will be seen that the construction heretofore related in connection with the knife blade holder permits the adjustment of the knife blade by merely turning the nut 103, which is an integral part of threaded member 90, so that more tension is placed on resilient member 97. There is no other adjustment provided for the knife blade and none is needed when this method is employed.

Figure 9:
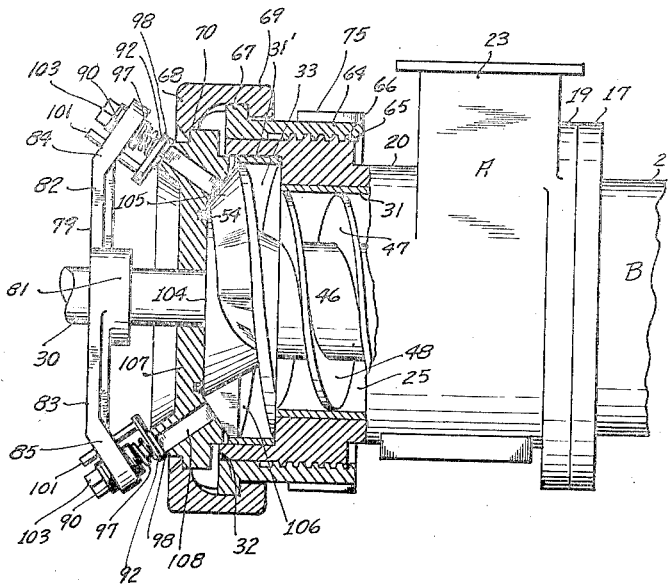
Figure 9 is a fragmentary, sectional, side elevation of a machine embodying the principles of my invention, showing a slightly modified compression-head and slightly modified die, both particularly adapted for use in the manufacture of cube feeds.

In Figure 9 is shown a machine embodying the principles of my invention specifically adapted for manufacturing cube-shaped feeds rather than pellet-shaped feeds. The structural characteristics of this machine are identical with those of the machine heretofore described and shown in Figures 1, 2, and 3. There is, however, a slight difference in the structural characteristics of the compression-head and die. The compression-head 104, employed in the machine as shown in Figure 9, has threads 105 and 106, of equal pitch, disposed in opposition to each other. These threads start on a vertical plane and at their starting point are identical in size and shape to the threads on compression-head 51. They, however, gradually diminish in depth while gradually developing into the angle corresponding to the angle possessed by the inner working surface of the die so that, except for the change in the depth of the threads in compression head 104, the threads are identical to the threads on compression-head 51. The die 107 has a plurality of cube-shaped openings 108 extending therethrough. Except for the fact that die 107 is not bowl-shaped, although its inner working surface is frustoconically-shaped, the remainder of the die construction is identical with the die previously described and functions in substantially the same manner and has its working surface positioned at an angle corresponding to the angle assumed by the working surface of the threads 105 and 106.

While this specification sets forth the present type of construction, still in practice, deviations in detail may be made by those skilled in the art to which this invention relates, but which do not depart from the spirit and scope of the invention as defined by the appended claims. I, therefore, reserve to myself all such changes, modifications and adaptations which may be made to my invention and which are circumscribed by the claims appended hereto.

Having described my invention, what I claim as new and useful and upon which I desire to secure Letters Patent is:

1. An extrusion machine for compressed feeds of the class described comprising, a cylindrical casing, a shaft extending longitudinally therethrough, means for supporting said shaft at its front end, means secured to the rear of the cylindrical casing adapted for supporting the rear end of and driving said shaft, a screw-worm conveyor keyed to said shaft and disposed within said cylindrical casing, a compression-head also keyed to said shaft and disposed within said cylindrical casing, the threads of said screw-worm conveyor and said compression-head coinciding at their meeting ends, a bowl-shaped die disposed about said shaft and positioned at the delivery end of said cylindrical casing, said die having the following structural characteristics: a body member with a solid vertical face, a hub extending through said solid face, an annular groove formed within the inner wall of said solid face and surrounding said hub, a perforated annular member integrally joined to and extending rearwardly from and at a predetermined angle to said solid face, an annular flange extending from the periphery of the perforated annular member, and an annular shoulder formed at right angles to said flange, means for fixedly holding the die adjacent the front end of said cylindrical casing, means for providing adjustment between the die and front end of the compression-head, and means keyed to the shaft and cooperating with the outside working surface of the die for severing any of the materials extruded through the die.

2. In an extrusion machine for compressed feeds of the class described comprising, a cylindrical casing the front portion of which has an enlarged interior, a screw-worm conveyor rotatably disposed within all except the enlarged portion of said cylindrical casing, a compression-head rotatably disposed within the enlarged portion of the cylindrical casing and extending slightly beyond the front end of said casing, a die disposed at the front end of said casing possessing a frustoconically contoured, foraminated portion adapted to coincide with the working portion of the threads of said compression-head, said die having the following structural characteristics: a body member with a solid vertical face, a hub extending through said solid face, an annular groove formed within the inner wall of said solid face and surrounding said hub, a perforated annular member integrally joined to and extending rearwardly from and at a predetermined angle to said solid face, an annular flange extending from the periphery of the perforated annular member, and an annular shoulder formed at right angles to said flange, means for holding the die in fixed relation to the front end of said cylinder, means for providing adjustment between the compression-head and said die, said means including an internally threaded jacket threadably disposed about said cylinder, a plurality of ledges disposed on said jacket, a retaining ring having corresponding stop lugs disposed therein adapted to fit over the peripheral surface of said die and engage with the ledges of said jacket, said jacket having a spur gear disposed on the outside thereof, means for turning said jacket about said cylinder and means cooperating with the outside surface of the frustoconically contoured portion of said die for severing the material as it is extruded through the die.

3. A die to be used with an extrusion machine for compressed feeds of the class described comprising, a body-member having a solid vertical face, a hub extending through said solid face, an annular groove formed within the inside wall of said solid face and surrounding said hub, a perforated annular member integrally joined to and extending rearwardly from and at a predetermined angle to said solid face, said annular member and solid face forming a die frustoconical in contour, an annular flange extending from the periphery of the perforated member, and an annular shoulder formed at right angles to the flange.

4. In an extrusion machine for compressed feeds of the class described, in combination with a cylindrical casing and a screw-worm conveyor, of an equally pitched, multi-threaded compression-head adapted to coincide with the threads of the screw-worm conveyor, said threads starting on a vertical plane and gradually developing into a predetermined working angle that is maintained throughout the major part of the threads and a die comprising, a body-member, bowl-shaped in appearance, the perforated working surface of which is angularly disposed with relation to the compression-head, providing therebetween a working correlation for effectively extruding materials in process through the perforations in the die, and means formed in the front end of the compression-head and in the rear wall of the die for preventing the extrusion of the materials in process past said means.

5. In combination, a frustoconically contoured die-member having passages disposed through the frustoconical portion of said member, said die having the following structural characteristics: a body member with a solid vertical face, a hub extending through said solid face, an annular groove formed within the inner wall of said solid face and surrounding said hub, a perforated annular member integrally joined to and extending rearwardly from and at a predetermined angle to said solid face, an annular flange extending from the periphery of the perforated annular member, and an annular shoulder formed at right angles to said flange, and a multi-threaded compression-head partially positioned within the interior of said die in working relation thereto, the angle of the working portion of the threads being equal to the angle of the frustoconical portion of the die.

6. Cutting means to be used with an extrusion machine for compressed feeds of the class described comprising, a knife blade supporting member, arms extending from said member, each of said arms having its ends bent at a predetermined angle, and said arms each having a threaded opening and an opening in parallel relation thereto, recessed members threadably disposed in the threaded opening of each of said arms, a knife blade holder having an annularly grooved stem has its stem disposed within the recess of the threaded member, a secondary stem joined to the knife blade holder and passing through the other opening of said arm, a resilient member surrounding the main stem and disposed between the threaded member and the knife blade holder for cushioning the knife blade holder, and a knife joined to the knife blade holder.

CLAUDE C. HALL.